US010634366B1

(12) United States Patent
Bentley et al.

(10) Patent No.: US 10,634,366 B1
(45) Date of Patent: Apr. 28, 2020

(54) COOKTOP VENTILATION SYSTEM HAVING A SMOKE DETECTION AND ALARM SYSTEM

(71) Applicants: BSH Home Appliances Corporation, Irvine, CA (US); BSH Hausgeräte GmbH, Munich (DE)

(72) Inventors: Garrett Bentley, Knoxville, TN (US); Tyrel Alastair Hunter, Nampa, ID (US); Sean Maloney, Lasalle (CA); Jack Miller, Talheim (DE); Samuel Steele, Ypsilanti, MI (US); Vincent Trieu, Northville, MI (US)

(73) Assignees: BSH Home Appliances Corporation, Irvine, CA (US); BSH Hausgerate GmbH, Munich (DE)

( * ) Notice: Subject to any disclaimer, the term of this patent is extended or adjusted under 35 U.S.C. 154(b) by 0 days.

(21) Appl. No.: 16/214,186

(22) Filed: Dec. 10, 2018

(51) Int. Cl.
*F24C 15/20* (2006.01)
*A62C 3/00* (2006.01)

(52) U.S. Cl.
CPC .......... *F24C 15/2021* (2013.01); *A62C 3/006* (2013.01)

(58) Field of Classification Search
CPC ............................ F24C 15/2021; A62C 3/006
USPC ........................................................ 340/628
See application file for complete search history.

(56) References Cited

U.S. PATENT DOCUMENTS

| 5,127,479 | A | 7/1992 | Stehling et al. |
| 6,578,569 | B2 | 6/2003 | Liese |
| 6,920,874 | B1* | 7/2005 | Siegel ................. F24C 15/2021 126/21 A |
| 7,303,024 | B2 | 12/2007 | Mikulec |
| 7,866,312 | B2 | 1/2011 | Erdmann |
| 8,890,034 | B2 | 11/2014 | Mishra |
| 9,010,313 | B2 | 4/2015 | Mikulec |
| 9,109,805 | B2 | 8/2015 | Bach |
| 9,677,772 | B2 | 6/2017 | Siegel et al. |
| 2006/0164253 | A1* | 7/2006 | Harvey .................. G08B 17/10 340/628 |
| 2009/0085754 | A1 | 4/2009 | Myllumaki |

(Continued)

FOREIGN PATENT DOCUMENTS

| EP | 2602557 A2 | 6/2013 |
| ES | 2049604 A2 | 4/1994 |

(Continued)

*Primary Examiner* — Hirdepal Singh
(74) *Attorney, Agent, or Firm* — Michael E. Tschupp; Andre Pallapies; Brandon G. Braun

(57) ABSTRACT

A cooktop ventilation appliance or system for providing ventilation for a domestic cooking appliance, includes a housing configured to communicate with a ventilation device to convey air from an environment around the domestic cooking appliance into the housing, and a smoke detection and alarm system including at least one sensor configured to detect a density of particles in the air conveyed by the ventilation device, and a control unit in communication with the at least one sensor. The control unit is configured to compare the density of particles detected by the at least one sensor to a predetermined threshold particle density at a given air speed of the air being conveyed and activate an alarm if the density of particles detected by the at least one sensor exceeds the predetermined threshold particle density for the given air speed.

32 Claims, 10 Drawing Sheets

(56) References Cited

U.S. PATENT DOCUMENTS

| | | | | |
|---|---|---|---|---|
| 2014/0234496 A1* | 8/2014 | Siegel | ............... | A47J 27/62 |
| | | | | 426/231 |
| 2015/0226439 A1* | 8/2015 | Mikulec | ............ | F24C 15/2021 |
| | | | | 99/337 |
| 2016/0235239 A1* | 8/2016 | Patadia | ............ | A47J 44/00 |
| 2017/0246487 A1* | 8/2017 | Livchak | ............ | A62C 37/40 |
| 2018/0023828 A1* | 1/2018 | Lutz | ................ | H04B 1/3822 |
| | | | | 700/276 |

FOREIGN PATENT DOCUMENTS

| | | |
|---|---|---|
| JP | H051835 A | 1/1993 |
| WO | 2010000947 A2 | 1/2010 |

\* cited by examiner

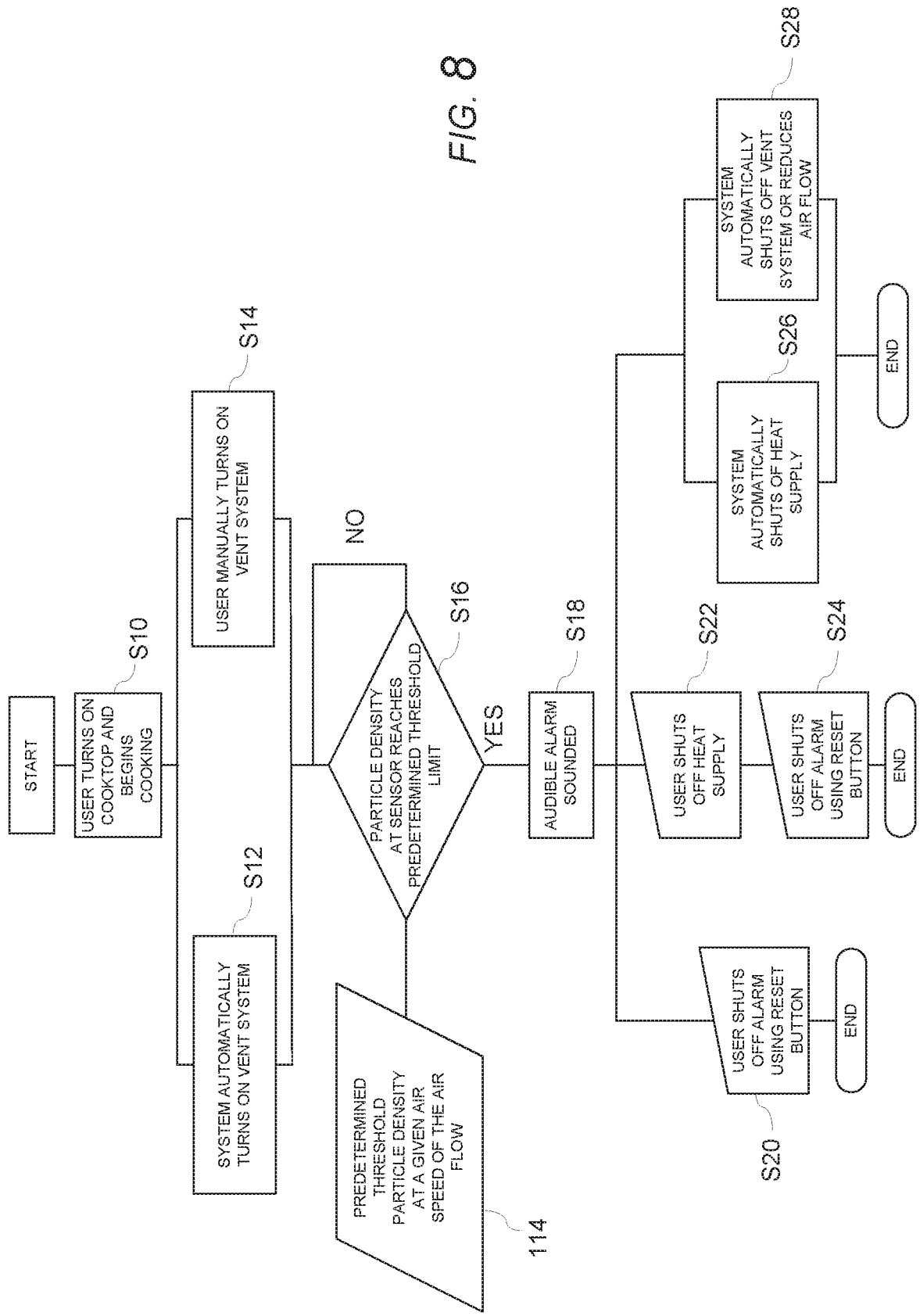

COOKTOP VENTILATION SYSTEM HAVING A SMOKE DETECTION AND ALARM SYSTEM

FIELD OF THE INVENTION

The present invention is directed to a ventilation system for a domestic home appliance, and more particularly, to a domestic cooktop ventilation system having a smoke detection and alarm system.

BACKGROUND OF THE INVENTION

Some modern domestic kitchens include an appliance, such as a cooking range or cooktop, that has an electric or gas heat source such as an inductive, electric, or gas cooktop, a griddle, an internal heat source such as an oven or warming drawer, or other feature that requires ventilation. Various types of ventilation appliances have been provided for ventilating or filtering air in a kitchen, such as a traditional wall ventilation hood, a chimney ventilation hood, an island ventilation hood, an over-range microwave, etc. In some circumstances, such as a heat source being used for a cooking event being left unattended or unsupervised, there may be a risk of fire associated with the cooking event.

SUMMARY OF THE INVENTION

The present invention recognizes that, currently, the typical solution for preventing a fire in an unattended cooking event is a smoke detector/alarm in the home. Statistical studies, such as studies by the Consumer Product Safety Commission (CPSC), show that many fire events that are extinguished by a user in a home or residence are not alerted until after there is an active fire event. Additionally, such statistical studies show that, in many cases, the user is not alerted to the fire event by a smoke detector in the home until after the user has already become aware of the fire event by other means (e.g., the user visually observes smoke or fire, the user smells smoke or burning food, etc.). The present invention recognizes that a reason for this observed result is because smoke detectors often are not placed in a kitchen or near cooking appliances, in an attempt to minimize or prevent setting off the alarm during normal cooking operations (i.e., nuisance alarms or false alarms). Instead, smoke detectors commonly are placed greater than 10-15 feet away, and in many cases greater than 20 feet away, from a cooking appliance to minimize nuisance alarms. Since a smoke detector is placed farther away, it takes a longer period of time for the smoke to reach the smoke detector and activate the alarm, and therefore, the fire event or situation may have already progressed into an open fire before the detector sounds the alarm. The present invention recognizes that, by placing an intelligent smoke detection and alarm system directly over a possible location of a fire, such as on a domestic cooktop ventilation system, a fire event can be detected earlier, and the alarm can be sounded earlier, thereby increasing a likelihood of alerting a user who can then take remedial steps to prevent the situation from worsening or developing into an open fire. The present invention further recognizes that it is desirable for such an intelligent smoke detection and alarm system to be capable of minimizing or preventing nuisance alarms or false alarms during normal cooking operations (i.e., non-fire events).

To solve these and other problems, the present invention provides a domestic ventilation appliance and system for providing ventilation for a domestic cooking appliance, in which the domestic cooktop ventilation appliance or system includes a smoke detection and alarm system, thereby improving a likelihood of notifying a user that there is a potential danger earlier than a standard home smoke detector. The smoke detection and alarm system is configured to improve fire prevention resulting from unattended items cooking on a cooking appliance, such as a cooktop, by recognizing a level of smoke passing through the ventilation system at a particular air speed that is greater than a predetermined threshold level of smoke at the particular air speed during a normal cooking operation, and alerting a user to the potential danger (e.g., a fire event or a potential or impending fire event), while at the same time minimizing or preventing nuisance alarms or false alarms from occurring during normal cooking operations (i.e., non-fire events). In some examples, the level of smoke can be determined, for example, by measuring, using a sensor, an amount (e.g., density or concentration) of one or more particulates, such as, for example, water vapor, $CO_2$, CO, soot (carbon), volatile organic compounds, hydrocarbons, and/or other particulate matter in the airflow passing through the ventilation system. The amount (e.g., density or concentration) may be measured individually for any one of, or a combination of, the particulates measured within the airflow, and/or as a comparison of one or more totals of "particulate" density or concentration in the airflow, etc., compared to one or more predetermined amounts (e.g., predetermined density or concentration) of such one or more particulates in a normal airflow.

In an exemplary embodiment, a domestic ventilation appliance for providing ventilation for a domestic cooking appliance, comprises a housing configured to communicate with a ventilation device to convey air from an environment around the domestic cooking appliance into the housing, and a smoke detection and alarm system including at least one sensor configured to detect a density of particles in the air conveyed by the ventilation device, and a control unit in communication with the at least one sensor, wherein the control unit is configured to compare the density of particles detected by the at least one sensor to a predetermined threshold particle density at a given air speed of the air being conveyed and activate an alarm if the density of particles detected by the at least one sensor exceeds the predetermined threshold particle density for the given air speed.

Another exemplary embodiment of the invention is directed to a smoke detection and alarm system configured for use in a domestic ventilation appliance for providing ventilation for a domestic cooking appliance. The smoke detection and alarm system includes at least one sensor configured to detect a density of particles in the air conveyed by the ventilation device, and a control unit in communication with the at least one sensor, wherein the control unit is configured to compare the density of particles detected by the at least one sensor to a predetermined threshold particle density at a given air speed of the air being conveyed and activate an alarm if the density of particles detected by the at least one sensor exceeds the predetermined threshold particle density for the given air speed.

A further exemplary embodiment of the invention is directed to a method of smoke detection and alarm signaling for a domestic ventilation appliance for providing ventilation for a domestic cooking appliance, wherein the domestic ventilation appliance includes a housing configured to communicate with a ventilation device to convey air from an environment around the domestic cooking appliance into the housing, and a smoke detection and alarm system including at least one sensor configured to detect a density of particles in the air conveyed by the ventilation device, and a control unit in communication with the at least one sensor. The exemplary method includes a step of comparing, by the control unit, the density of particles detected by the at least one sensor to a predetermined threshold particle density at a given air speed of the air being conveyed, and a step of activating, by the control unit, an alarm when the density of particles detected by the at least one sensor exceeds the predetermined threshold particle density for the given air speed.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 8 is a schematic flow diagram of a smoke detection and alarm method for a cooktop ventilation appliance or system having a smoke detection and alarm system according to exemplary embodiments of the invention.

DETAILED DESCRIPTION OF THE EXEMPLARY EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With reference to FIGS. 1-8, exemplary embodiments of a ventilation appliance or system 100 having a smoke detection and alarm system 200, and method or processes performed by such systems, will now be described.

Figure 1:
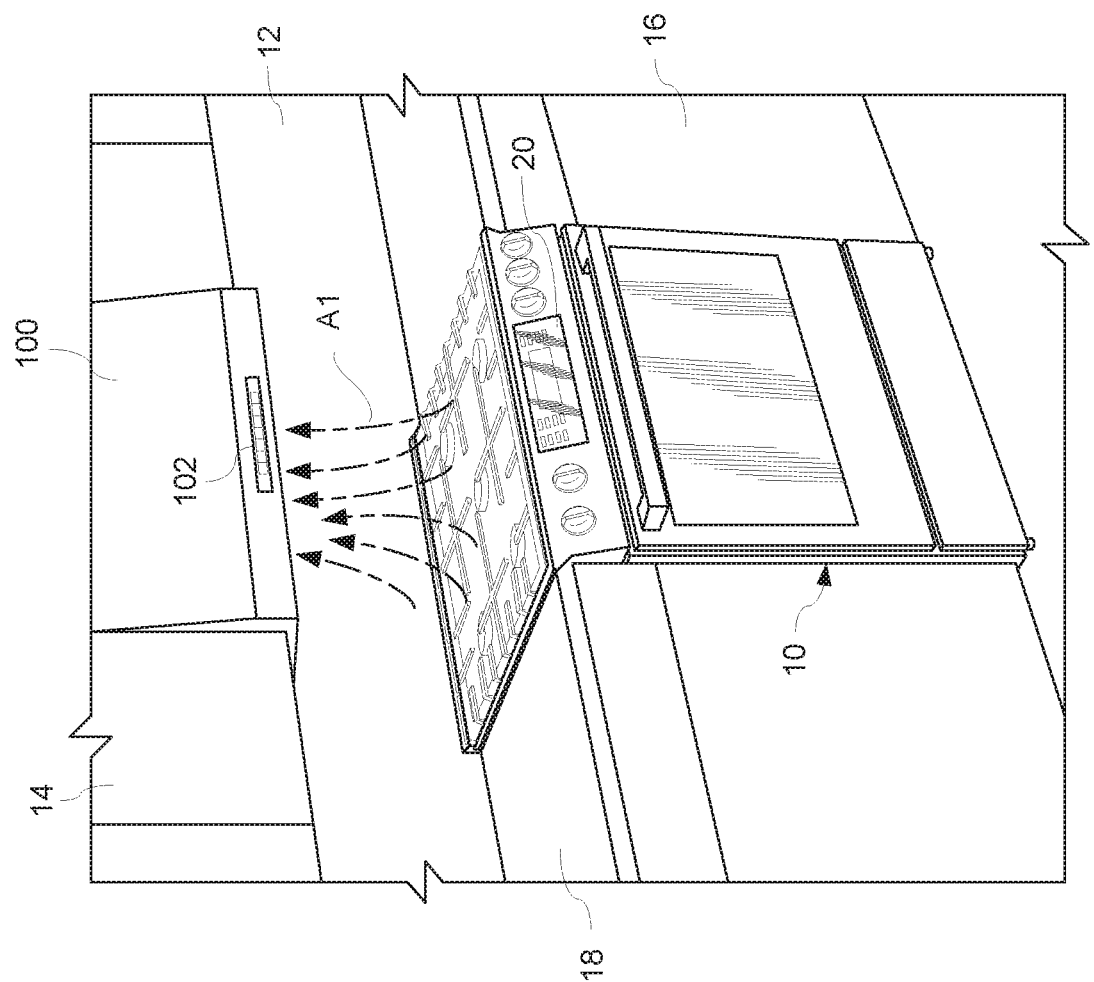
FIG. 1 is a front perspective view of a domestic kitchen with a cooktop ventilation appliance or system having a smoke detection and alarm system according to an exemplary embodiment of the invention.
Figure 2:
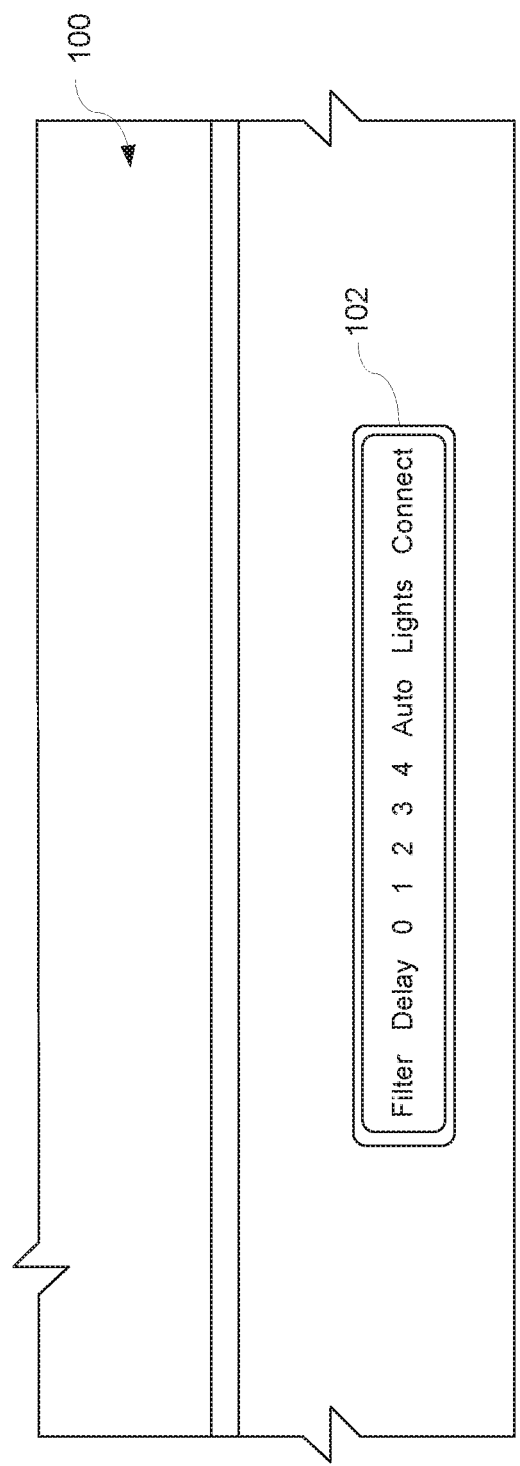
FIG. 2 is a partial front view of the cooktop ventilation appliance or system of FIG. 1.

FIGS. 1 and 2 illustrate an example of a ventilation appliance or system 100 having a smoke detection and alarm system 200 shown in a kitchen and arranged above a domestic home cooking appliance, such as a cooking range 10 having a gas cooktop and an internal heat source such as an oven, which require ventilation. The ventilation appliance or system 100 can be mounted on a wall 12 of the kitchen adjacent to cabinetry 14 and above the cooking range 10, which can be disposed adjacent to floor cabinets 16 and counters 18. In other examples, the ventilation appliance or system 100 can be a ceiling mounted hood, a chimney wall hood, or an island hood, as well as various other types of ventilation appliances, such as an over-the-range microwave, a built-in microwave, a down-draft ventilation system (e.g., fixed or telescopic), a cooktop having a down-draft ventilation system (e.g., fixed or telescopic), etc. In some examples, the ventilation appliance or system 100 can be configured to draw in the vapors (e.g., smoke, steam, grease, odors, etc.) produced during cooking into the housing of the ventilation appliance and then exhaust (e.g., filter and exhaust, for example using one or more grease filters to absorb grease) the air to the outside of the home, for example via a duct, wall vent, roof vent, etc. In other examples, the ventilation appliance or system 100 can be a ductless or recirculation system that is configured to draw in the vapors produced during cooking into the housing of the ventilation appliance, filter the air (e.g., using one or more grease filters to absorb grease and one or more activated carbon/charcoal filters to absorb odors, etc.), and then discharge the clean air back into the home (e.g., back into the kitchen).

The ventilation appliance or system 100 can include a user interface or control panel 102, or the like, for controlling operation of one or more components of the appliance, such as manually or automatically selecting one or more fan speeds for a blower (e.g., blower 106, which is described in greater detail with reference to FIG. 3) for conveying air from an environment around the domestic cooking appliance into the housing of the ventilation appliance or system 100. The control panel 102 can be provided on or recessed in an exterior surface of the appliance 100, or at other locations, such as on a surface or component on an underside of the ventilation appliance 100 or on a side of the ventilation appliance 100. FIG. 2 shows an example of a control panel 102 having one or more user input selectors, such as buttons or touch sensitive regions for turning the appliance on or off, manually or automatically selecting one or more fan speeds, selecting delayed operation, turning a light on and off, resetting a filter, and/or connecting the control panel 102 to a remote or wireless device, such as an application on a smartphone, personal computer, home automation system, or other electronic device. In other examples, the control panel 102 can include other features and controls, or combinations thereof, such as a single speed fan, dual speed fan, three speed fan, auto fan, etc. In another example, the ventilation appliance 100 can be configured to be controlled remotely or wirelessly, for example, via an application on a smartphone, personal computer, home automation system, security or monitoring system, or other electronic device. In these examples, the ventilation appliance 100 can be provided with or without a user interface 102.

Figure 3A:
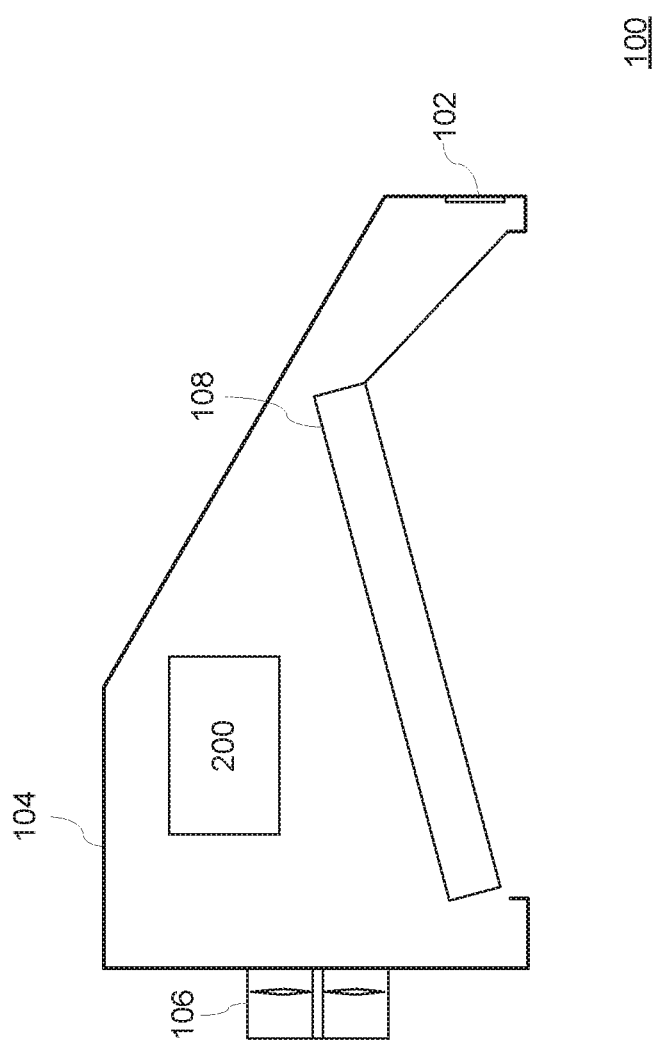
FIGS. 3A and 3B are schematic cutaway side views of exemplary cooktop ventilation appliances or systems having a smoke detection and alarm system according to an exemplary embodiment of the invention.
Figure 3B:
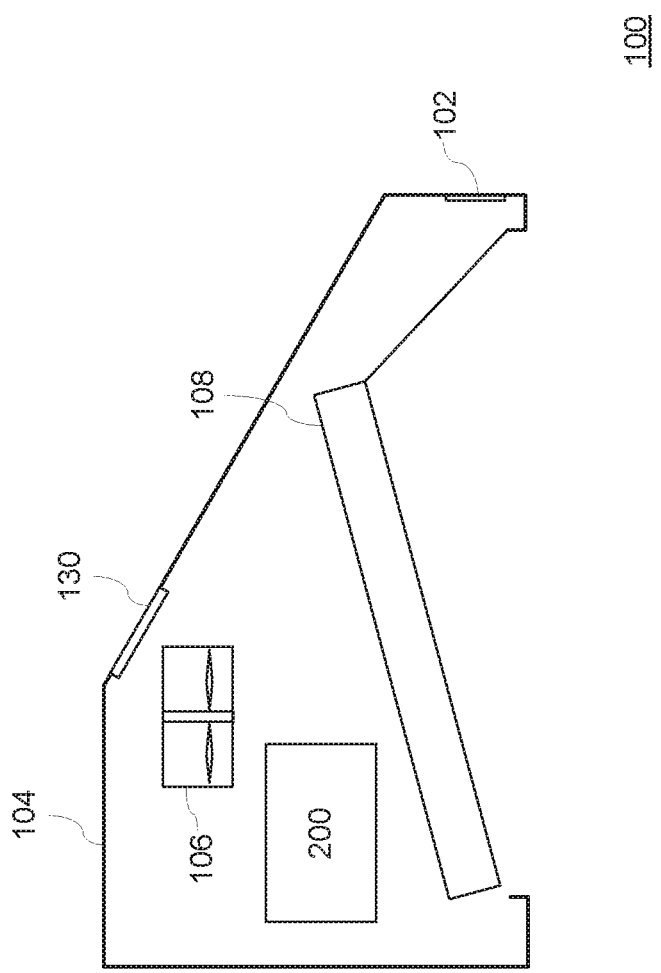

With reference to FIGS. 3A and 3B, examples of a ventilation appliance or system 100 having a smoke detection and alarm system 200 can include a housing 104 configured to convey air (e.g., hot air, flue gases, contaminated air, etc.) from an environment around the domestic cooking appliance 10 into the housing 104 at one or more manually or automatically selected air speeds. In these examples, the ventilation device 100 can include a blower or fan 106 in communication with the interior of the housing 104 for conveying the air through the housing 104. The blower 106 is schematically illustrated on the housing 104 of the ventilation device 100. The ventilation is not limited to this example, and can include an integral blower (a blower integrated into the ventilation appliance), an inline blower (a blower mounted along the duct line at a location between the ventilation appliance and an outside wall), or a remote blower (a blower mounted on the roof or exterior wall of the home) 106 for conveying the air through the housing 104. The exhaust outlet of the ventilation appliance 100 can be configured to exhaust the air from, for example, a rear wall of the housing 104 (i.e., a horizontal discharge transition, as shown in the example of FIG. 3A) or from a top, upper wall of the housing 104 (i.e., a vertical discharge transition), where the air is conveyed to the outside of the home, for example via a duct, wall vent, roof vent, etc. In other examples, such as in a ductless or recirculation system (as shown for example in FIG. 3B), the exhaust outlet of the ventilation appliance 100 can be configured to exhaust or discharge the air (e.g., filtered air) from, for example, one or more vents 130 on the housing 104 and back into the home (e.g., back into the kitchen). The one or more vents 130 are not limited to any particular arrangement and can be one or more openings located on one or more surfaces or areas of the appliance or located remotely from the appliance. As shown in the examples of FIGS. 3A and 3B, the ventilation device 100 can include a user interface or control panel 102, or the like, for controlling operation of one or more components of the appliance, such as manually or automatically selecting one or more fan speeds for the blower. The ventilation device 100 commonly includes one or more filters (e.g., air filter, grease filter, activated carbon/charcoal filter, etc.) 108, as well as other associated components.

The smoke detection and alarm system 200 is configured to improve a likelihood of notifying a user that there is a potential danger earlier than a standard home smoke detector, and more particularly, to improve fire prevention resulting from unattended items cooking on a cooking appliance, such as a cooktop 10, by recognizing a level of smoke passing through the ventilation system 100 at a particular air speed that is greater than a predetermined threshold level of smoke at the particular air speed during a normal cooking operation, and alerting a user to the potential danger (e.g., a fire event or a potential or impending fire event), while at the same time minimizing or preventing nuisance alarms or false alarms from occurring during normal cooking operations (i.e., non-fire events). In some examples, the level of smoke can be determined, for example, by measuring, using a sensor (e.g., 110 in FIGS. 4-7), an amount (e.g., density or concentration) of one or more particulates, such as, for example, water vapor, $CO_2$, CO, soot (carbon), volatile organic compounds, hydrocarbons, and/or other particulate matter in the airflow passing through the ventilation system 100. The amount (e.g., density or concentration) may be measured individually for any one of, or a combination of, the particulates measured within the airflow, and/or as a comparison of one or more totals of "particulate" density or concentration in the airflow, etc., compared to one or more predetermined amounts (e.g., predetermined density or concentration) of such one or more particulates in a normal airflow.

Figure 4:
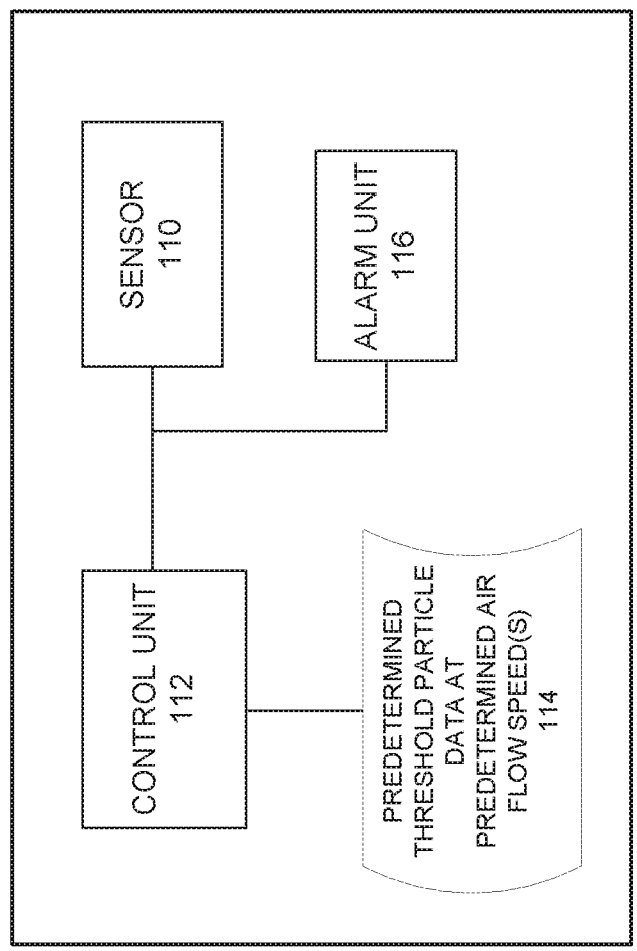
FIG. 4 is a schematic block diagram of a cooktop ventilation appliance or system having a smoke detection and alarm system according to an exemplary embodiment of the invention.

FIG. 4 is a block diagram schematically illustrating an example of a smoke detection and alarm system 200. In this example, the system 200 includes at least one sensor 110 configured to detect a density of particles in the air being conveyed by the ventilation device 100. The system 200 includes a controller or control unit 112 in communication with the at least one sensor 110, and configured to compare the density of particles detected by the at least one sensor 110 to a predetermined threshold particle density 114 at a given air speed of the air being conveyed by the ventilation device 100. If the density detected by the at least one sensor 110 exceeds the predetermined threshold particle density at the given air speed, then the control unit 112 can be configured to activate an alarm unit 116. The controller or control unit 112 can be configured to communicate (e.g., via wired or wireless communication, such as Bluetooth, Wi-Fi, cellular, optical, app communication, Z-wave, etc.) with the one or more sensors 110, an integral or external device having the predetermined threshold particle density 114, and the alarm unit 116. The controller or control unit 112 also can be configured to communicate (e.g., via wired or wireless communication) with one or more other components, such as a control panel 102 or controller of the ventilation appliance 100, the fan/blower 106, as well as other components.

Figure 5A:
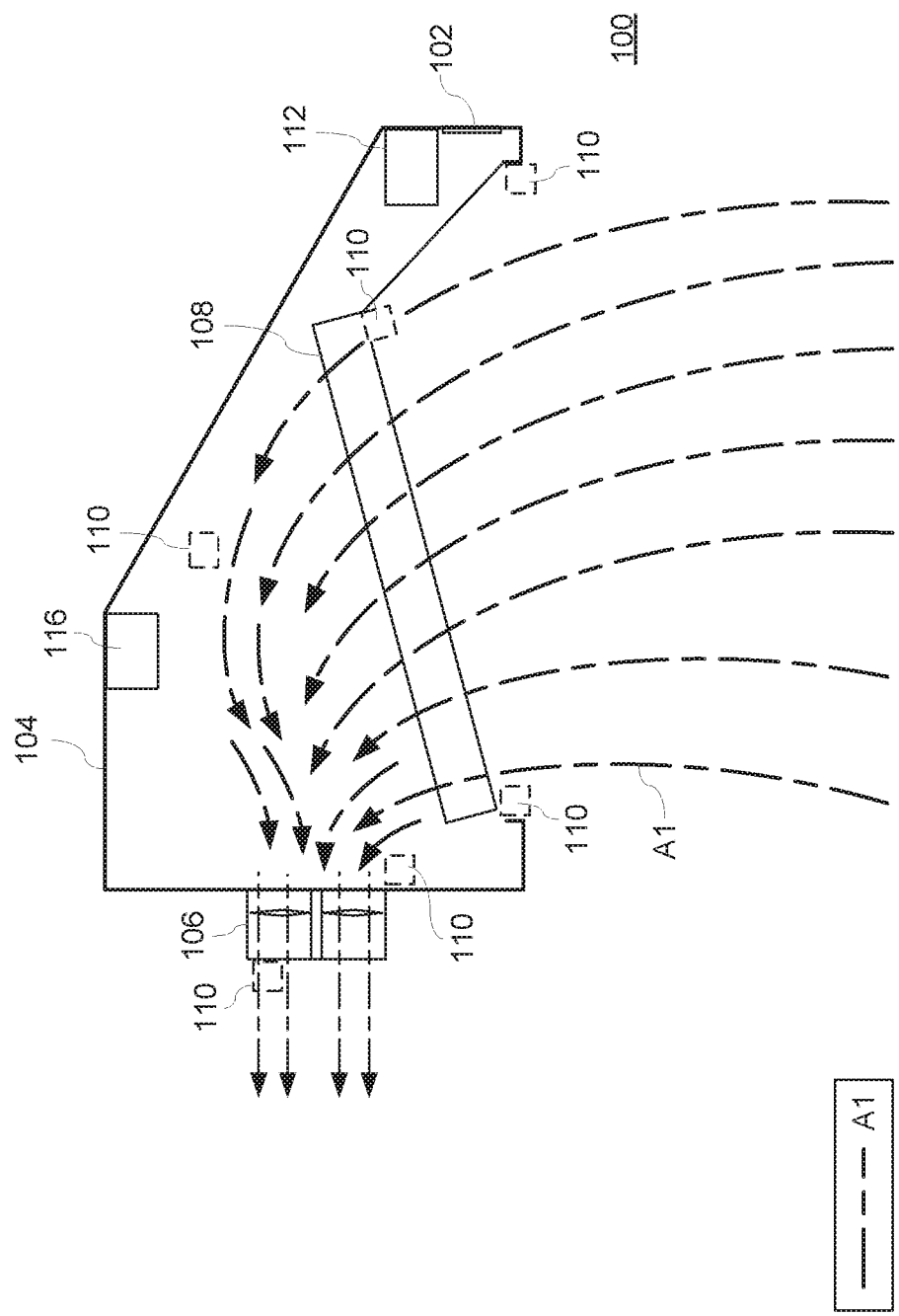
FIGS. 5A and 5B are schematic cutaway side views of exemplary cooktop ventilation appliances or systems having a smoke detection and alarm system according to an exemplary embodiment of the invention.
Figure 5B:
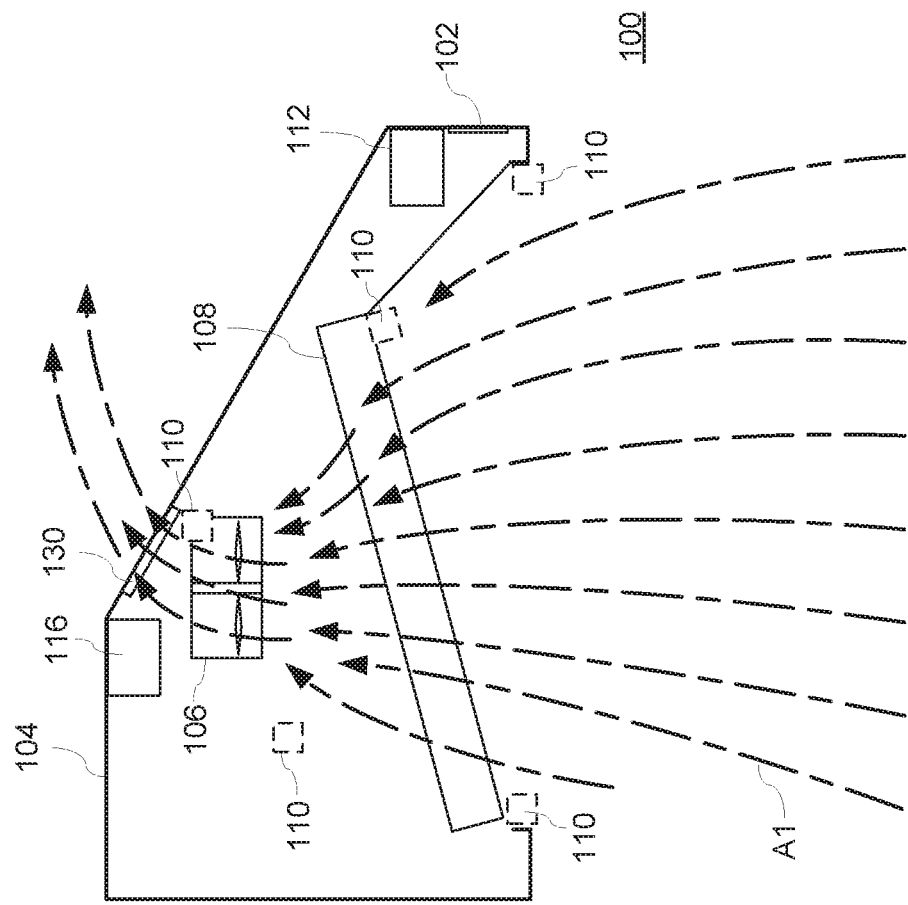
Figure 6:
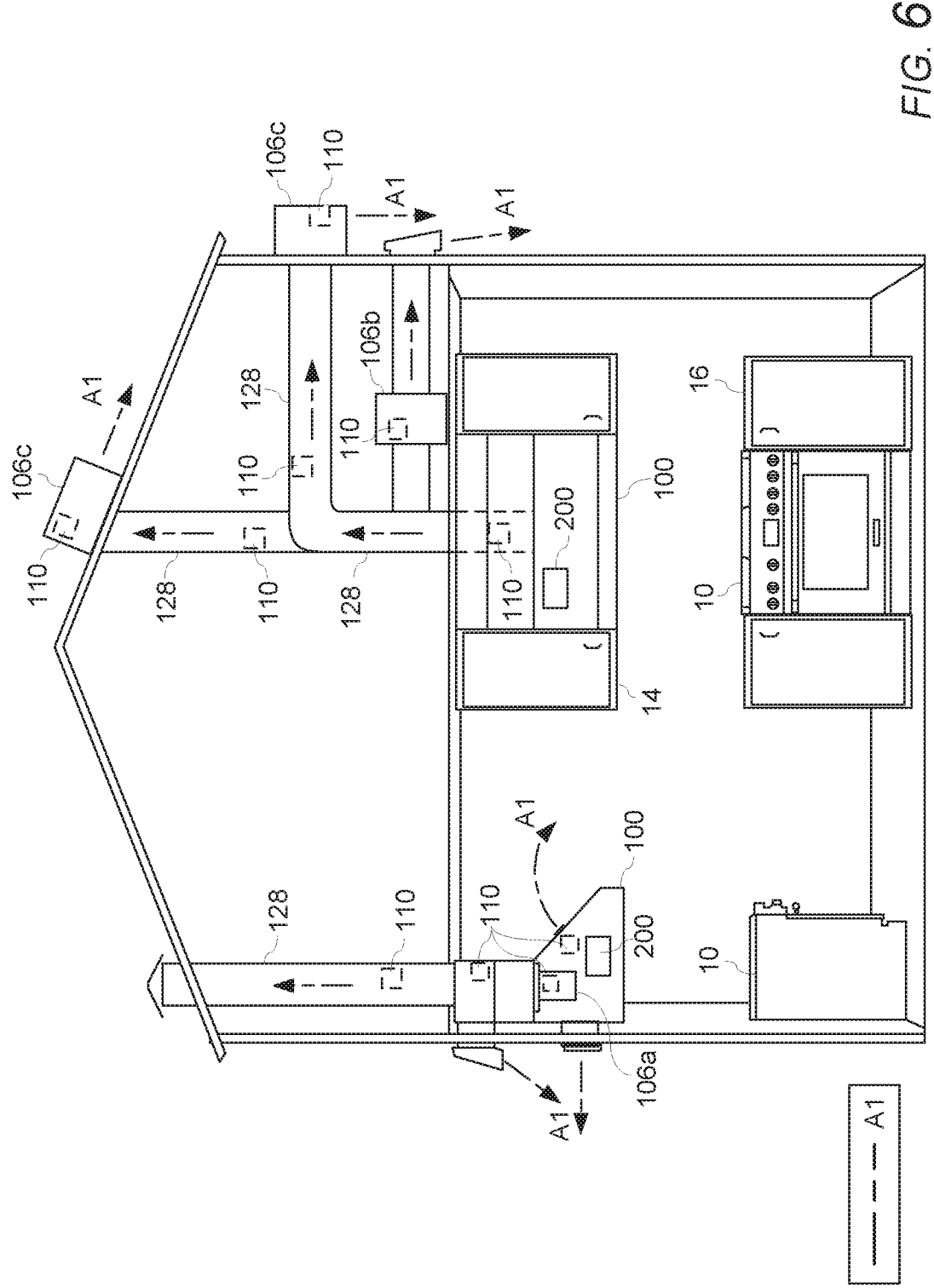
FIG. 6 is a schematic diagram of a home having a cooktop ventilation appliance or system having a smoke detection and alarm system according to exemplary embodiments of the invention.

With reference to FIGS. 5A and 5B, examples of various features and arrangements of a ventilation appliance or system 100 having a smoke detection and alarm system 200 will now be described. The ventilation appliance 100 includes a housing 104 configured to convey air A1 (e.g., hot air, flue gases, contaminated air, etc.) from an environment around the domestic cooking appliance 10 into the housing 104 at one or more manually or automatically selected air speeds. In this example, the ventilation device 100 includes a blower or fan 106 in communication with the interior of the housing 104 for conveying the air A1 through the housing 104. The blower 106 is schematically illustrated on the housing 104 of the ventilation device 100. The ventilation is not limited to this example, and can include an integral blower (a blower integrated into the ventilation appliance), an inline blower (a blower mounted along the duct line at a location between the ventilation appliance and an outside wall), or a remote blower (a blower mounted on the roof or exterior wall of the home) 106 for conveying the air A1 through the housing 104. The exhaust outlet of the ventilation appliance 100 can be configured to exhaust the air A1 from, for example, a rear wall of the housing 104 (i.e., a horizontal discharge transition, as shown in the example in FIG. 5A) or from a top, upper wall of the housing 104 (i.e., a vertical discharge transition). In other examples, such as in a ductless or recirculation system (as shown for example in FIG. 5B), the exhaust outlet of the ventilation appliance 100 can be configured to exhaust or discharge the air (e.g., filtered air) from, for example, one or more vents 130 on the housing 104 and back into the home (e.g., back into the kitchen). The one or more vents 130 are not limited to any particular arrangement and can be one or more openings located on one or more surfaces or areas of the appliance or located remotely from the appliance. As shown in the examples of FIGS. 5A and 5B, the ventilation device 100 can include a user interface or control panel 102, or the like, for controlling operation of one or more components of the appliance, such as manually or automatically selecting one or more fan speeds for the blower. The ventilation device 100 can include one or more filters (e.g., air filter, grease filter, activated carbon/charcoal filter, etc.) 108, as well as other associated components.

As shown in the examples illustrated in FIGS. 5A and 5B, one or more components of the system 200 can integrated into the ventilation appliance 100. In other examples, the system 200 can configured as a single unit that can be mounted on the appliance 100 or retrofit onto an existing appliance 100. The system 200 can include at least one sensor 110 configured to detect a density of particles in the air A1 being conveyed by the ventilation device 100. In some examples, the sensor 110 can include one or more of an integrated volatile organic compound sensor, a differential infrared (IR) sensor, a laser smoke sensor, a temperature sensor, an aerosol mass spectrometer, or a combination of these and/or other sensors for detecting a density of particles in the air A1. The one or more sensors 110 can be provided in an interior of the housing 104 of the ventilation device 100, for example, in a flow path of the air A1. With reference again to the examples of FIGS. 5A and 5B, and to the examples in FIG. 6, one or more sensors 110 can be provided in a flow path of the air A1, such as at or on an edge of an inlet opening of the housing 104 of the ventilation device 100, at or on the filter 108, at or on the blower/fan 106 (e.g., an integral blower 106a integrated into the ventilation appliance 100, an inline blower 106b mounted along a duct line 128 at a location between the ventilation appliance 100 and an outside wall or roof of the home, a remote blower 106c mounted on the roof or exterior wall of the home, etc.), in a flow path A1 of the exhaust air flow exiting the ventilation system 200, such as upstream or downstream of a blower/fan 106, at or on an edge of an exhaust or discharge vent 130 of the housing 104 of the ventilation device 100 in a recirculation system, along one or more exhaust ducts 128 at a location between the ventilation appliance 100 and an outside wall (e.g., a roof or exterior wall of the home), etc., or at or on a combination of any one or more of the example locations.

In the examples in FIGS. 5A and 5B, the smoke detection and alarm system 200 can include a controller or control unit 112. The controller or control unit 112 can be a separate component (as shown in the example), or in other examples, can be integrally provided with another component, such as the control panel 102 or another control unit of the appliance 100. The smoke detection and alarm system 200 can include an alarm unit 116 such as, for example, an audible alarm device, a visual alarm device, a notification sent to one or more other components such as one or more remote or wireless devices, or a combination of two or more thereof. The alarm unit 116 can be a separate component (as shown in the example), or in other examples, can be integrally provided with another component, such as the control panel 102 or another control unit of the appliance 100. A remote or wireless alarm unit 116 can be provided, for example, by an application on a smartphone, personal computer, home automation system, security or monitoring system, or other electronic device. The controller or control unit 112 can be configured to communicate (e.g., via wired or wireless communication, such as Bluetooth, Wi-Fi, cellular, optical, app communication, Z-wave, etc.) with one or more of the sensors 110, the alarm unit 114, the control panel 102, and/or the fan/blower 106, among other components. Some or all of the components (e.g., 102, 106, 110, 112, 114, etc.) may be configured to communicate directly with one another, for example, in a mesh network (e.g., Z-wave).

In operation, the sensor 110 detects a density of particulates in the air A1, and the control unit 112 of the system 200 compares the particle density detected by the sensor 110 to a predetermined threshold particle density at a given air speed of the air flow A1. When the detected density of particulates in the air A1 reaches or exceeds the predetermined threshold amount, the control unit 112 of the domestic ventilation appliance activates an alarm unit 116 (e.g., activates power to an alarm unit or transmits a control signal to an alarm unit (e.g., via wired or wireless communication).

The control unit 112 can be configured to receive or determine the given air speed of the air flow A1 in one or more ways. For example, the control unit 112 can be configured to receive a separate input from the control panel 102 indicating the air speed that has been manually selected by a user or automatically set by the control panel 102. In other examples, the control unit 112 can be configured to receive a user input indicating the air speed. In other examples, the control unit 112 can be configured to determine the air speed based, for example, on a particular program or process, or a subprogram or process step, being performed by the ventilation appliance 100. The control unit 112 can be configured to communicate with the control panel 102 or a controller of the appliance 100, or the control unit can be integrated into the control system or control panel 102 of the appliance 100.

As mentioned, the control unit 112 of the system 200 compares the particle density detected by the sensor 110 to a predetermined threshold particle density at the given air speed of the air flow A1. The predetermined threshold particle density can correspond to a predetermined particle level (i.e., smoke level) at a given air speed that approaches a predetermined combustion point. The threshold particle density can be predetermined for one or more air speeds, for one or more types of appliances 10 to be ventilated, such as a gas cooking appliance or an electric cooking appliance, and/or for one or more types of ventilation appliances 100, such as a ventilation appliance that exhausts air to the outside or a ductless or recirculation appliance that discharges the air back into the home, among other things. The predetermined threshold particle density can be provided in a number of ways.

Figure 7:
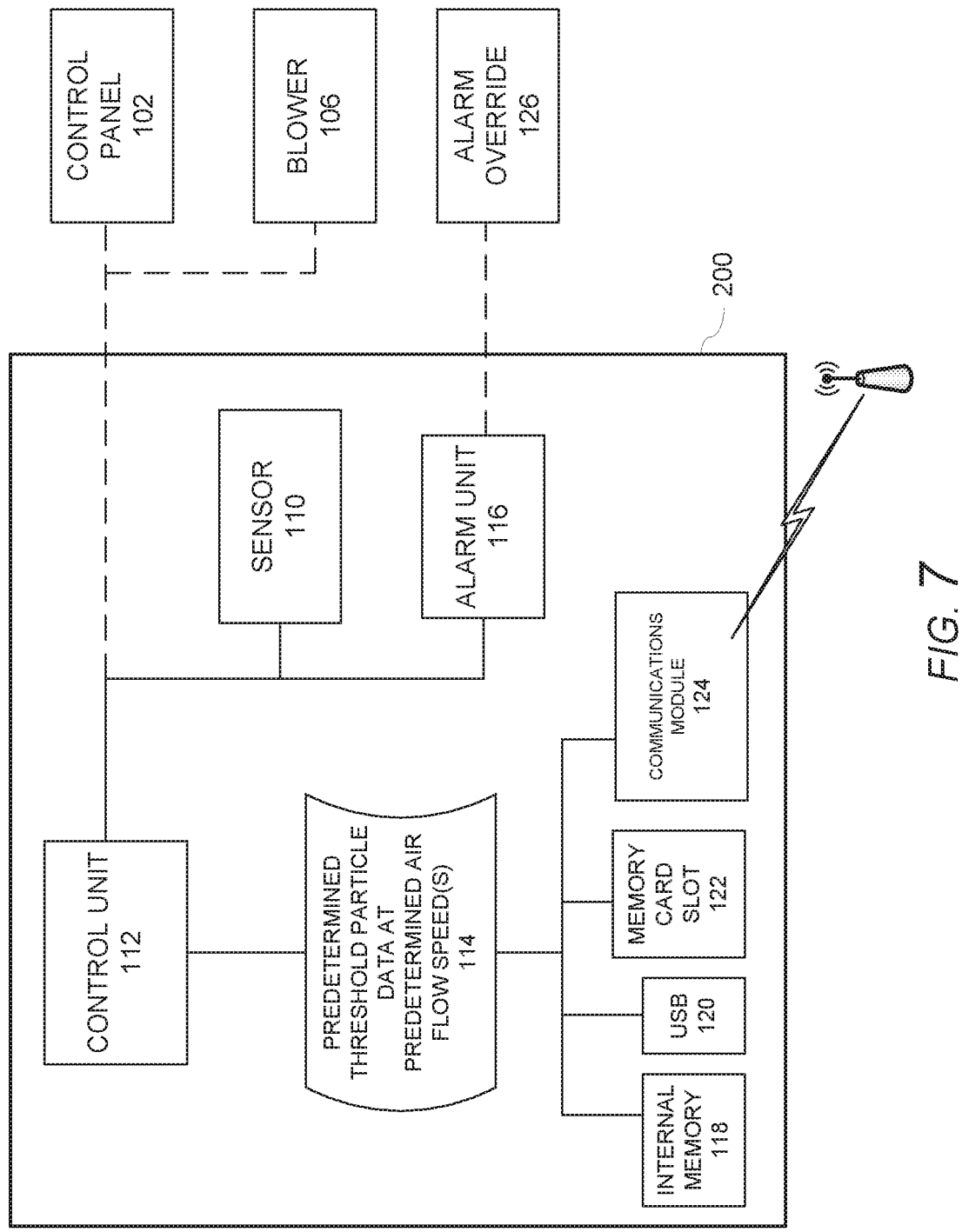
FIG. 7 is a schematic block diagram of a cooktop ventilation appliance or system having a smoke detection and alarm system according to exemplary embodiments of the invention.

As shown in the example block diagram in FIG. 7, the system 200, or a component of the system 200, can be configured to store or receive the data related to the predetermined threshold particle density at one or more air speeds and/or for one or more types of appliances in a number of ways. For example, as shown in FIG. 7, the system can include one or more of an internal memory 118, a USB port 120, a memory card slot 122, and/or communications module 124 (wired or wireless). In some examples, the system 200 can be preconfigured to use predetermined threshold particle density data for one or more air speeds, and/or one or more types of appliances, such as a gas cooking appliance or an electric cooking appliance, etc. The control unit 112 then can compare the particle density detected by the at least one sensor 110 to the appropriate predetermined threshold particle density at the given air speed, and to activate an alarm, such as alarm unit 116, if the density detected by the at least one sensor 110 reaches or exceeds the predetermined threshold particle density at the given air speed.

In some examples, the system 200 can be arranged in communication with a remote or wireless device, such as an application on a smartphone, personal computer, home automation system, security or monitoring system, or other electronic device, and can be configured to receive information from the remote or wireless device with respect to the predetermined threshold particle density. The remote or wireless device can be arranged in communication with the system via wired or wireless communication, such as Bluetooth, Wi-Fi, cellular, optical, app communication, etc. Upon receiving the predetermined threshold particle density, the control unit 112 then can compare the particle density detected by the at least one sensor 110 to the appropriate predetermined threshold particle density at the given air speed, and to activate an alarm, such as alarm unit 116, if the density detected by the at least one sensor 110 reaches or exceeds the predetermined threshold particle density at the given air speed.

In other examples, the system 200 can be configured such that a user can input, for example using the USB port 120, memory card slot 122, etc., information with respect to the predetermined threshold particle density at one or more air speed. Based on the user input, the control unit 112 can compare the particle density detected by the at least one sensor 110 to the appropriate predetermined threshold particle density (e.g., for a gas cooking appliance or an electric cooking appliance) at the given air speed, and to activate an alarm, such as alarm unit 116, if the density detected by the at least one sensor 110 reaches or exceeds the predetermined threshold particle density at the given air speed.

In other examples, the system 200 can be configured such that a user (or an installer) can input or select, for example using the control panel 102 or another setting, the type of appliance being ventilated (e.g., gas or electric). Based on the user input, the control unit 112 can compare the particle density detected by the at least one sensor 110 to the appropriate predetermined threshold particle density (e.g., for a gas cooking appliance or an electric cooking appliance) at the given air speed and for a particular type of appliance (e.g., gas or electric), and to activate an alarm, such as alarm unit 116, if the density detected by the at least one sensor 110 reaches or exceeds the predetermined threshold particle density at the given air speed for that type of appliance.

In other examples, the control unit 112 can be configured to determine the type of appliance being ventilated. For example, the control unit 112 can be configured to determine whether the cooking appliance 10 is a gas cooking appliance or an electric cooking appliance by comparing the density detected by the at least one sensor 110 and at least one other factor, such as a temperature of the air A1, to predetermined data with respect to one or more types of cooking appliances. Upon determining the type of the cooking appliance 10, the control unit 112 then can select the appropriate predetermined threshold particle density data, and compare the particle density detected by the at least one sensor 110 to the appropriate predetermined threshold particle density at the given air speed for that type of appliance, and to activate an alarm, such as alarm unit 116, if the density detected by the at least one sensor 110 reaches or exceeds the predetermined threshold particle density at the given air speed for that type of appliance.

In these exemplary ways, the system 200 can improve fire prevention resulting from unattended items cooking on a cooking appliance, such as a cooktop, by recognizing a level of smoke passing through the ventilation system 100 at a particular air speed that is at least one of equal to or greater than a predetermined threshold level of smoke at the particular air speed during a normal cooking operation, and alerting a user to the potential danger (e.g., a fire event or a potential or impending fire event), while at the same time minimizing or preventing nuisance alarms or false alarms from occurring during normal cooking operations (i.e., non-fire events).

With reference again to FIG. 1, the appliance to be ventilated, such as the cooking range 10, can include a user interface or control panel 20. The system 200 can be arranged in communication with the domestic cooking appliance 10 (e.g., connected to the control panel 20 or a controller of the cooking appliance 10 via a wired or wireless communication, such as Bluetooth, Wi-Fi, cellular, optical, app communication, Z-wave, etc.), and can be configured to transmit and/or receive information from the cooking appliance 10 with respect to the type of cooking appliance. The control panel 20 of the cooking range 10 can be connected, or synched, to the ventilation appliance 100, such that the control panel 20 of the cooking range 10 is capable of communicating with and controlling operation of the ventilation appliance 100. Upon receiving the information with regard to the type of appliance from the cooking appliance 10, the control unit 112 then can select the appropriate predetermined threshold particle density data, and compare the particle density detected by the at least one sensor 110 to the appropriate predetermined threshold particle density at the given air speed for that type of appliance, and to activate an alarm, such as alarm unit 116, if the density detected by the at least one sensor 110 reaches or exceeds the predetermined threshold particle density at the given air speed for that type of appliance.

With reference again to FIG. 7, in an example, the system 200 can include an override button 126 that can be activated when a user is present and has confirmed that a fire is not imminent. For example, the override button 126 can be provided on the control panel 102 of the ventilation appliance 100, or remotely located in another location, such as a housing 104 of the appliance 100, on the cooking appliance 10, on a housing of the system 200 (e.g., if the system 200 is an individual or separate component), or on a wall or adjacent cabinetry of the kitchen. An override function also can be provided by a remote or wireless device, such as an application on a smartphone, personal computer, home automation system, security or monitoring system, or other electronic device.

In another example, in which the system 200 is arranged in communication with the domestic cooking appliance 10 (e.g., connected to the cooking appliance 10 in FIG. 1 via a wired or wireless communication), and can be configured to control the cooking appliance 10, the control unit 112 of the system 200 can turn off the heat supply to one or more components of the cooking appliance in the event of an imminent fire, such as the cooktop, oven, etc. The control unit 112 of the system 200 can be connected to the cooking appliance 10, for example, via Bluetooth, Wi-Fi, cellular, app communication, Z-wave, etc.

In another example, the system 200 can be arranged in communication with a smart home network and integrated into one or more home systems, such as a security or monitoring system, communication system, etc., to alert a user to an imminent or actual fire event. The system 200 can be configured to communicate with one or more other components via Bluetooth, Wi-Fi, cellular, app communication, Z-wave, SMS text, and/or email notification. In this way, a user that is not in close enough proximity to hear or see the alarm can be alerted to a fire event, or imminent fire event, by the system 200.

In other examples, the control unit 112 of the system 200 can be configured to communicate with one or more of the control panel 102 and blower 106 of the system 100 and to reduce or shut off the airflow being conveyed by the ventilation appliance 100 if a fire event, or imminent fire event, is detected.

With reference to FIG. 8, example operations of a smoke detection and alarm system 200, and a ventilation appliance or system 100 having a smoke detection and alarm system 200, will now be described. In operation, a user turns on a cooktop 10 and begins cooking (S10). The ventilation system 100 can be configured to automatically activate the blower 106 (S12) or the user can manually activate the ventilation system 100 (S14). Next, the sensor 110 detects a density of particulates in the air A1, and the control unit 112 of the system 200 compares (e.g., continuously compares) the particle density detected by the sensor 110 to a predetermined threshold particle density (114) at a given air speed of the air flow A1 (S16). When the detected density of particulates in the air A1 reaches or exceeds the predetermined threshold amount, the control unit 112 of the domestic ventilation appliance activates (S18) an alarm unit 116 (e.g., activates power to an alarm unit or transmits a control signal to an alarm unit (e.g., via wired or wireless communication). At this time, a user can observe the cooking appliance 10, and if no fire event is imminent, then the user can manually shut off the alarm using, for example, the reset button (S20). Alternatively, a user can observe the cooking appliance 10, and if a fire event is in progress or is imminent, then the user can manually shut off the heat source (S22), and if desired, manually shut off the alarm using, for example, the reset button (S24). In other examples, the system 200 can be configured to automatically shut off the heat source (S26) and/or automatically shut off the blower 106 of the ventilation appliance 100 or reduce the air flow of the ventilation appliance 100 (S28).

With reference again to FIGS. 1-8, an exemplary embodiment of the invention is directed to a domestic ventilation appliance (e.g., 100) for providing ventilation for a domestic cooking appliance (e.g., 10), comprising a housing (e.g., 104) configured to communicate with a ventilation device (e.g., 106) to convey air (e.g., A1) from an environment around the domestic cooking appliance (e.g., 10) into the housing (e.g., 104); and a smoke detection and alarm system (e.g., 200) including at least one sensor (e.g., 110) configured to detect a density of particles in the air (e.g., A1) conveyed by the ventilation device (e.g., 106); and a control unit (e.g., 112) in communication with the at least one sensor (e.g., 110), wherein the control unit (e.g., 112) is configured to compare the density of particles detected by the at least one sensor (e.g., 110) to a predetermined threshold particle density at a given air speed of the air (e.g., A1) being conveyed and activate an alarm (e.g., 116) if the density of particles detected by the at least one sensor (e.g., 110) exceeds the predetermined threshold particle density for the given air speed.

Another exemplary embodiment of the invention is directed to a smoke detection and alarm system (e.g., 200) for a domestic ventilation appliance (e.g., 100) for providing ventilation for a domestic cooking appliance (e.g., 10), the smoke detection and alarm system (e.g., 200) comprising at least one sensor (e.g., 110) configured to detect a density of particles in the air (e.g., A1) conveyed by the ventilation device (e.g., 106); and a control unit (e.g., 112) in communication with the at least one sensor (e.g., 110), wherein the control unit (e.g., 112) is configured to compare the density of particles detected by the at least one sensor (e.g., 110) to a predetermined threshold particle density at a given air speed of the air (e.g., A1) being conveyed and activate an alarm (e.g., 116) if the density of particles detected by the at least one sensor (e.g., 110) exceeds the predetermined threshold particle density for the given air speed.

Yet an exemplary embodiment of the invention is directed to a method of smoke detection and alarm signaling for a domestic ventilation appliance (e.g., 100) for providing ventilation for a domestic cooking appliance (e.g., 10), wherein the domestic ventilation appliance (e.g., 100) includes a housing (e.g., 104) configured to communicate with a ventilation device (e.g., 106) to convey air (e.g., A1) from an environment around the domestic cooking appliance (e.g., 10) into the housing (e.g., 104); and a smoke detection and alarm system (e.g., 200) including at least one sensor (e.g., 110) configured to detect a density of particles in the air (e.g., A1) conveyed by the ventilation device (e.g., 106); and a control unit (e.g., 112) in communication with the at least one sensor (e.g., 110), the method comprising comparing, by the control unit (e.g., 112), the density of particles detected by the at least one sensor (e.g., 110) to a predetermined threshold particle density at a given air speed of the air being conveyed (S16); and activating, by the control unit (e.g., 112), an alarm when the density of particles detected by the at least one sensor (e.g., 110) exceeds the predetermined threshold particle density for the given air speed (S18).

The features of the present invention, described with reference to the examples in FIGS. 1-8, can improve fire prevention resulting from unattended items cooking on a cooking appliance, such as a cooktop, by recognizing a level of smoke passing through the ventilation system at a particular air speed that is greater than a predetermined threshold level of smoke at the particular air speed during a normal cooking operation, and alerting a user to the potential danger (e.g., a fire event or a potential or impending fire event), while at the same time minimizing or preventing nuisance alarms or false alarms from occurring during normal cooking operations (i.e., non-fire events).

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A domestic ventilation appliance for providing ventilation for a domestic cooking appliance, comprising:
   a housing configured to communicate with a ventilation device to convey air from an environment around the domestic cooking appliance into the housing; and
   a smoke detection and alarm system including:
      at least one sensor configured to detect a density of particles in the air conveyed by the ventilation device; and
      a control unit in communication with the at least one sensor, wherein the control unit is configured to compare the density of particles detected by the at least one sensor to a predetermined threshold particle density at a given air speed of the air being conveyed and activate an alarm if the density of particles detected by the at least one sensor exceeds the predetermined threshold particle density for the given air speed, wherein the control unit is configured to select the predetermined threshold particle density at the given air speed from a plurality of predetermined threshold particle densities at a plurality of air speeds.

2. The domestic ventilation appliance of claim 1, wherein the at least one sensor includes at least one of an integrated volatile organic compound sensor, a differential IR sensor, a laser smoke sensor, a temperature sensor, or an aerosol mass spectrometer.

3. The domestic ventilation appliance of claim 1, wherein the control unit is configured to receive the given air speed of the air from at least one of a control panel of the domestic ventilation appliance and the ventilation device.

4. The domestic ventilation appliance of claim 1, wherein the control unit determines the given air speed of the air based on an air speed setting of the ventilation device of the domestic ventilation appliance.

5. The domestic ventilation appliance of claim 1, wherein the control unit determines the given air speed of the air based on an air speed setting selected by a user on a control panel of the domestic ventilation appliance.

6. The domestic ventilation appliance of claim 1, wherein the control unit is further configured to select the predetermined threshold particle density at the given air speed from a plurality of predetermined threshold particle densities at a plurality of air speeds based on a type of the domestic cooking appliance.

7. The domestic ventilation appliance of claim 6, wherein the type of the domestic cooking appliance is one of a gas cooking appliance and an electric cooking appliance.

8. The domestic ventilation appliance of claim 6, wherein the control unit is configured to determine the type of the domestic cooking appliance based on the density of particles detected by the at least one sensor and at least one other factor.

9. The domestic ventilation appliance of claim 8, wherein the at least one other factor includes a temperature of the air.

10. The domestic ventilation appliance of claim 1, wherein the ventilation device is integral with the housing.

11. The domestic ventilation appliance of claim 1, wherein the smoke detection and alarm system includes an override input device configured for user intervention to de-activate the alarm.

12. The domestic ventilation appliance of claim 1, wherein the control unit is configured to communicate with the domestic cooking appliance and to automatically de-activate a heat supply to one or more components of the domestic cooking appliance if the density of particles detected by the at least one sensor exceeds the predetermined threshold particle density for the given air speed.

13. The domestic ventilation appliance of claim 1, wherein the control unit is configured to communicate with at least one of a control panel of the domestic cooking appliance and the ventilation device, and to one of:
automatically de-activate the ventilation device if the density of particles detected by the at least one sensor exceeds the predetermined threshold particle density for the given air speed, and
automatically reduce an air speed setting of the ventilation device if the density of particles detected by the at least one sensor exceeds the predetermined threshold particle density for the given air speed.

14. A method of smoke detection and alarm signaling for the domestic ventilation appliance having the smoke detection and alarm system of claim 1, the method comprising:
comparing, by the control unit, the density of particles detected by the at least one sensor to the predetermined threshold particle density at the given air speed of the air being conveyed;
activating, by the control unit, the alarm when the density of particles detected by the at least one sensor exceeds the predetermined threshold particle density for the given air speed, and
selecting, by the control unit, the predetermined threshold particle density at the given air speed from the plurality of predetermined threshold particle densities at the plurality of air speeds.

15. The method of claim 14, wherein the at least one sensor includes at least one of an integrated volatile organic compound sensor, a differential IR sensor, a laser smoke sensor, a temperature sensor, or an aerosol mass spectrometer.

16. The method of claim 14, further comprising:
selecting, by the control unit, the predetermined threshold particle density at the given air speed from a plurality of predetermined threshold particle densities at a plurality of air speeds based on a type of the domestic cooking appliance.

17. The method of claim 16, further comprising:
determining, by the control unit, the type of the domestic cooking appliance based on the density of particles detected by the at least one sensor and at least one other factor.

18. The method of claim 17, wherein the at least one other factor includes a temperature of the air.

19. The method of claim 16, further comprising:
de-activating, by the control unit, a heat supply to one or more components of the domestic cooking appliance if the density of particles detected by the at least one sensor exceeds the predetermined threshold particle density for the given air speed.

20. The method of claim 16, further comprising one of:
de-activating, by the control unit, the ventilation device when the density of particles detected by the at least one sensor exceeds the predetermined threshold particle density for the given air speed, and
reducing, by the control unit, an air speed setting of the ventilation device when the density of particles detected by the at least one sensor exceeds the predetermined threshold particle density for the given air speed.

21. A smoke detection and alarm system for a domestic ventilation appliance for providing ventilation for a domestic cooking appliance, the smoke detection and alarm system comprising:
at least one sensor configured to detect a density of particles in the air conveyed by the ventilation device; and
a control unit in communication with the at least one sensor, wherein the control unit is configured to compare the density of particles detected by the at least one sensor to a predetermined threshold particle density at a given air speed of the air being conveyed and activate an alarm if the density of particles detected by the at least one sensor exceeds the predetermined threshold particle density for the given air speed, wherein the control unit is configured to select the predetermined threshold particle density at the given air speed from a plurality of predetermined threshold particle densities at a plurality of air speeds.

22. The system of claim 21, wherein the at least one sensor includes at least one of an integrated volatile organic compound sensor, a differential IR sensor, a laser smoke sensor, a temperature sensor, or an aerosol mass spectrometer.

23. The system of claim 21, wherein the control unit is configured to receive the given air speed of the air from at least one of a control panel of the domestic ventilation appliance and the ventilation device.

24. The system of claim 21, wherein the control unit determines the given air speed of the air based on an air speed setting of the ventilation device of the domestic ventilation appliance.

25. The system of claim 21, wherein the control unit determines the given air speed of the air based on an air speed setting selected by a user on a control panel of the domestic ventilation appliance.

26. The system of claim 21, wherein the control unit is further configured to select the predetermined threshold particle density at the given air speed from a plurality of predetermined threshold particle densities at a plurality of air speeds based on a type of the domestic cooking appliance.

27. The system of claim 26, wherein the type of the domestic cooking appliance is one of a gas cooking appliance and an electric cooking appliance.

28. The system of claim 26, wherein the control unit is configured to determine the type of the domestic cooking appliance based on the density of particles detected by the at least one sensor and at least one other factor.

29. The system of claim 28, wherein the at least one other factor includes a temperature of the air.

30. The system of claim 21, wherein the smoke detection and alarm system includes an override input device configured for user intervention to de-activate the alarm.

31. The system of claim 21, wherein the control unit is configured to communicate with the domestic cooking appliance and to automatically de-activate a heat supply to one or more components of the domestic cooking appliance if the density of particles detected by the at least one sensor exceeds the predetermined threshold particle density for the given air speed.

32. The system of claim 21, wherein the control unit is configured to communicate with at least one of a control panel of the domestic cooking appliance and the ventilation device, and to one of:
- automatically de-activate the ventilation device if the density of particles detected by the at least one sensor exceeds the predetermined threshold particle density for the given air speed, and
- automatically reduce an air speed setting of the ventilation device if the density of particles detected by the at least one sensor exceeds the predetermined threshold particle density for the given air speed.

* * * * *